United States Patent
Saito et al.

(10) Patent No.: US 11,262,852 B2
(45) Date of Patent: Mar. 1, 2022

(54) INPUT DEVICE

(71) Applicant: PANASONIC INTELLECTUAL PROPERTY MANAGEMENT CO., LTD., Osaka (JP)

(72) Inventors: Yuta Saito, Okayama (JP); Kenichi Matsumoto, Okayama (JP); Ryo Nakae, Okayama (JP); Masanori Mitsuoka, Okayama (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 15/734,175

(22) PCT Filed: May 22, 2019

(86) PCT No.: PCT/JP2019/020198
§ 371 (c)(1),
(2) Date: Dec. 1, 2020

(87) PCT Pub. No.: WO2019/230510
PCT Pub. Date: Dec. 5, 2019

(65) Prior Publication Data
US 2021/0165498 A1 Jun. 3, 2021

(30) Foreign Application Priority Data
Jun. 1, 2018 (JP) .............................. JP2018-106209

(51) Int. Cl.
*G06F 3/02* (2006.01)
*G01L 1/14* (2006.01)
(52) U.S. Cl.
CPC ............ *G06F 3/0202* (2013.01); *G01L 1/144* (2013.01)

(58) Field of Classification Search
CPC ......... G06F 3/0202; G06F 3/01; G01L 1/144; G01L 1/14; H01H 13/52; H01H 13/00
See application file for complete search history.

(56) References Cited

U.S. PATENT DOCUMENTS

2008/0019115 A1* 1/2008 Park ....................... G02B 6/006
362/23.18
2008/0142350 A1* 6/2008 Karaki ................. H01H 13/702
200/512

(Continued)

FOREIGN PATENT DOCUMENTS

EP 3421292 A1 1/2019
JP 2002-124404 A 4/2002

(Continued)

OTHER PUBLICATIONS

International Search Report and Written Opinion issued in International Patent Application No. PCT/JP2019/020198, dated Aug. 27, 2019; with partial English translation.

*Primary Examiner* — Amit Chatly
(74) *Attorney, Agent, or Firm* — McDermott Will & Emery LLP (57) ABSTRACT

An input device includes one or more pressure detectors. Each of the one or more pressure detectors includes an electrode, an elastic body on the electrode, a pressing member disposed on an opposite side of the elastic body from the electrode, and a protective member. The protection member is disposed between the elastic body and the pressing member and has higher strength than the elastic body.

13 Claims, 7 Drawing Sheets

(56) References Cited

U.S. PATENT DOCUMENTS

| | | | | |
|---|---|---|---|---|
| 2014/0022177 A1* | 1/2014 | Shaw | ................... | H01H 13/702 |
| | | | | 345/168 |
| 2014/0326079 A1* | 11/2014 | Maeda | ................... | G01L 1/142 |
| | | | | 73/862.626 |
| 2015/0090579 A1* | 4/2015 | Kurikawa | ............ | H03K 17/955 |
| | | | | 200/600 |
| 2015/0277646 A1 | 10/2015 | Ogura et al. | | |

FOREIGN PATENT DOCUMENTS

| | | |
|---|---|---|
| JP | 2015-197299 A | 11/2015 |
| JP | 2016-109444 A | 6/2016 |
| KR | 10-2007-0009877 A | 1/2007 |
| WO | 2017/145446 A1 | 8/2018 |

\* cited by examiner

FIG. 11

INPUT DEVICE

CROSS-REFERENCE OF RELATED APPLICATIONS

This application is the U.S. National Phase under 35 U.S.C. § 371 of International Patent Application No. PCT/JP2019/020198, filed on May 22, 2019, which in turn claims the benefit of Japanese Application No. 2018-106209, filed on Jun. 1, 2018, the entire disclosures of which Applications are incorporated by reference herein.

TECHNICAL FIELD

The present disclosure generally relates to input devices, and specifically, to an input device used for input to various electronic apparatuses.

BACKGROUND ART

Patent Literature 1 discloses a touch panel (an input device) including a plurality of pressure sensing elements (pressure detectors). Each pressure sensing element includes: a substrate; a conductive structure member (a pressing member) extending from the substrate; an elastic electrode part (elastic body) facing a tip end of the conductive structure member; and an electrode support member facing the substrate via the conductive structure member and the elastic electrode part, supporting the elastic electrode part, and being flexible. In the pressure sensing element, as pressing force that presses the electrode support member to the substrate increases, a contact area between the conductive structure member of a conductive structure and the elastic electrode part increases. This increases a resistance value between the elastic electrode part and a conductor layer of the conductive structure. Based on a change in the resistance value, a change in the pressing force, which acts on the pressure sensing element is detectable.

In Patent Literature 1, when the contact area between the conductive structure member of the conductive structure and the elastic electrode part increases, the conductive structure may locally apply pressing force to the elastic electrode part. This may cause plastic deformation and/or deterioration of electrical characteristics of the elastic electrode part, which may cause deterioration of the performance of the input device.

CITATION LIST

Patent Literature

Patent Literature 1: JP 2015-197299 A

SUMMARY OF INVENTION

An object is to provide an input device with reduced deterioration of performance.

An input device of one aspect of the present disclosure includes one or more pressure detectors. Each of the one or more pressure detectors includes an electrode, an elastic body on the electrode, a pressing member on an opposite side of the elastic body from the electrode, and a protection member between the elastic body and the pressing member. The protection member has higher strength than the pressing member.

DESCRIPTION OF EMBODIMENTS

1. Embodiments

1.1 First Embodiment 1.1.1 Schema

Figure 1:
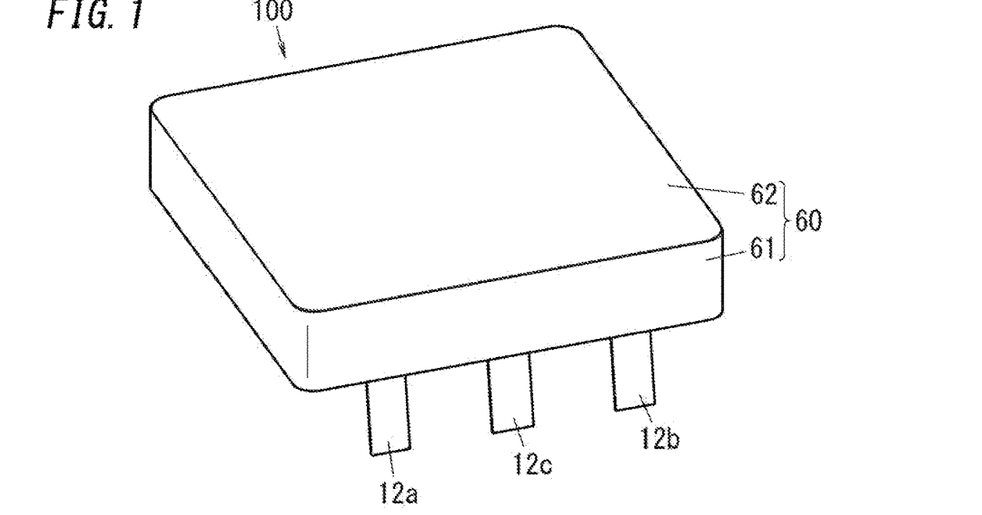
FIG. 1 is a perspective view illustrating an input device of a first embodiment.
Figure 2:
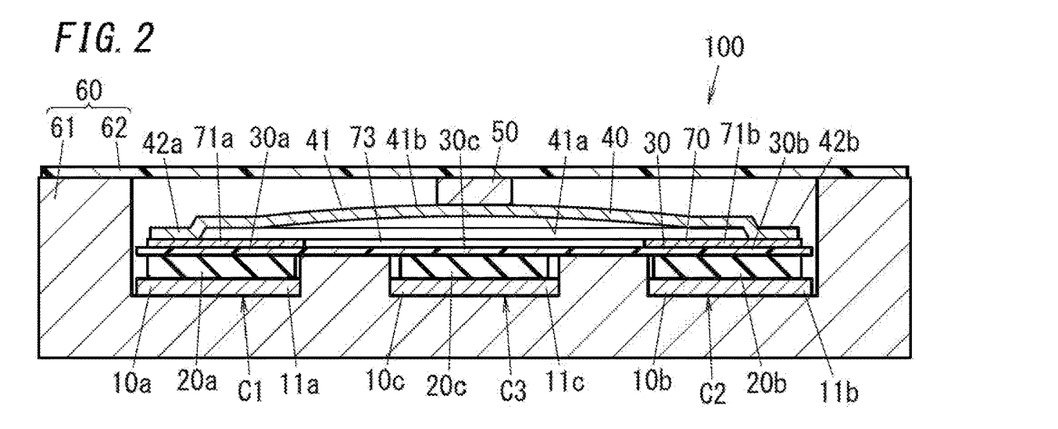
FIG. 2 is a view illustrating operation of the input device in a state where a metal dome is not pressed.
Figure 3:
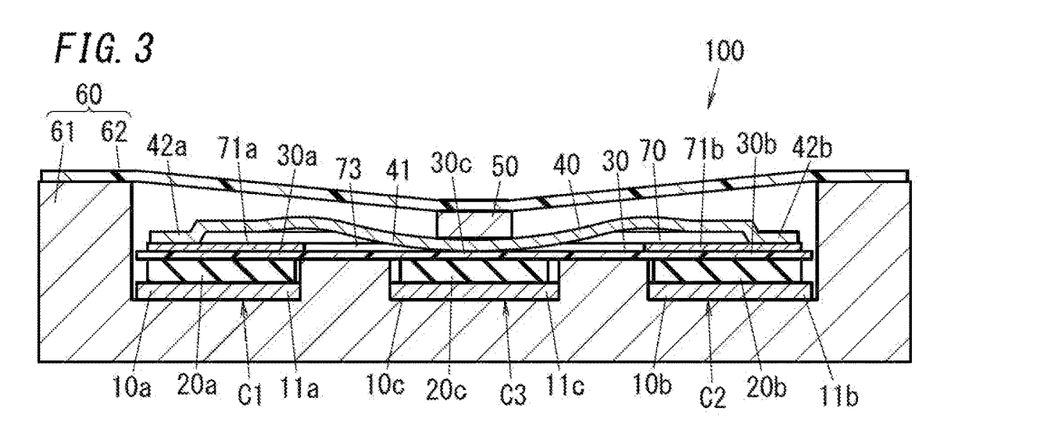
FIG. 3 is a view illustrating operation of the input device in a state where the metal dome is pressed.

FIG. 1 shows an input device 100 of the present embodiment. As illustrated in FIGS. 2 and 3, the input device 100 includes a plurality of pressure detectors C1 and C2. The pressure detector C1 includes an electrode 11a, an elastic body 20a, a pressing member 42a, and a protection member 71a. The pressure detector C2 includes an electrode 11b, an elastic body 20b, a pressing member 42b, and a protection member 71b. The elastic bodies 20a and 20b are respectively on the electrodes 11a and 11b. The pressing member 42a is disposed on an opposite side of the elastic body 20a from the electrode 11a. The pressing member 42b is disposed on an opposite side of the elastic body 20b from the electrode 11b. The protection member 71a is disposed between the elastic body 20a and the pressing member 42a and has higher strength than the elastic body 20a. The protection member 71b is disposed between the elastic body 20b and the pressing member 42b and has higher strength than the elastic body 20b.

When in the input device 100, pressing force acts on the pressing members 42a and 42b, the pressing force from the pressing members 42a and 42b respectively acts on the protection members 71a and 71b before on the elastic bodies 20a and 20b. Since the protection members 71a and 71b respectively have higher strength than the elastic bodies 20a and 20b, the pressing force from the pressing members 42a and 42b may be dispersedly, but not locally, applied to the elastic bodies 20a and 20b. This reduces the possibility that the pressing members 42a and 42b apply excessive force (pressure, pressing force) to the elastic bodies 20a and 20b. Thus, the occurrence of plastic deformation and deterioration of the electrical characteristics of the elastic body can be reduced. The occurrence of plastic deformation and the deterioration of the electrical characteristics of the elastic bodies may degrade the performance of the input device 100. Thus, according to the input device 100, the degradation of the performance can be reduced.

1.1.2 Configuration

With reference to FIGS. 1 to 7, the input device 100 will be described below in further detail. Note that FIG. 2 corresponds to a sectional view along line X-X of FIG. 7.

Figure 4:
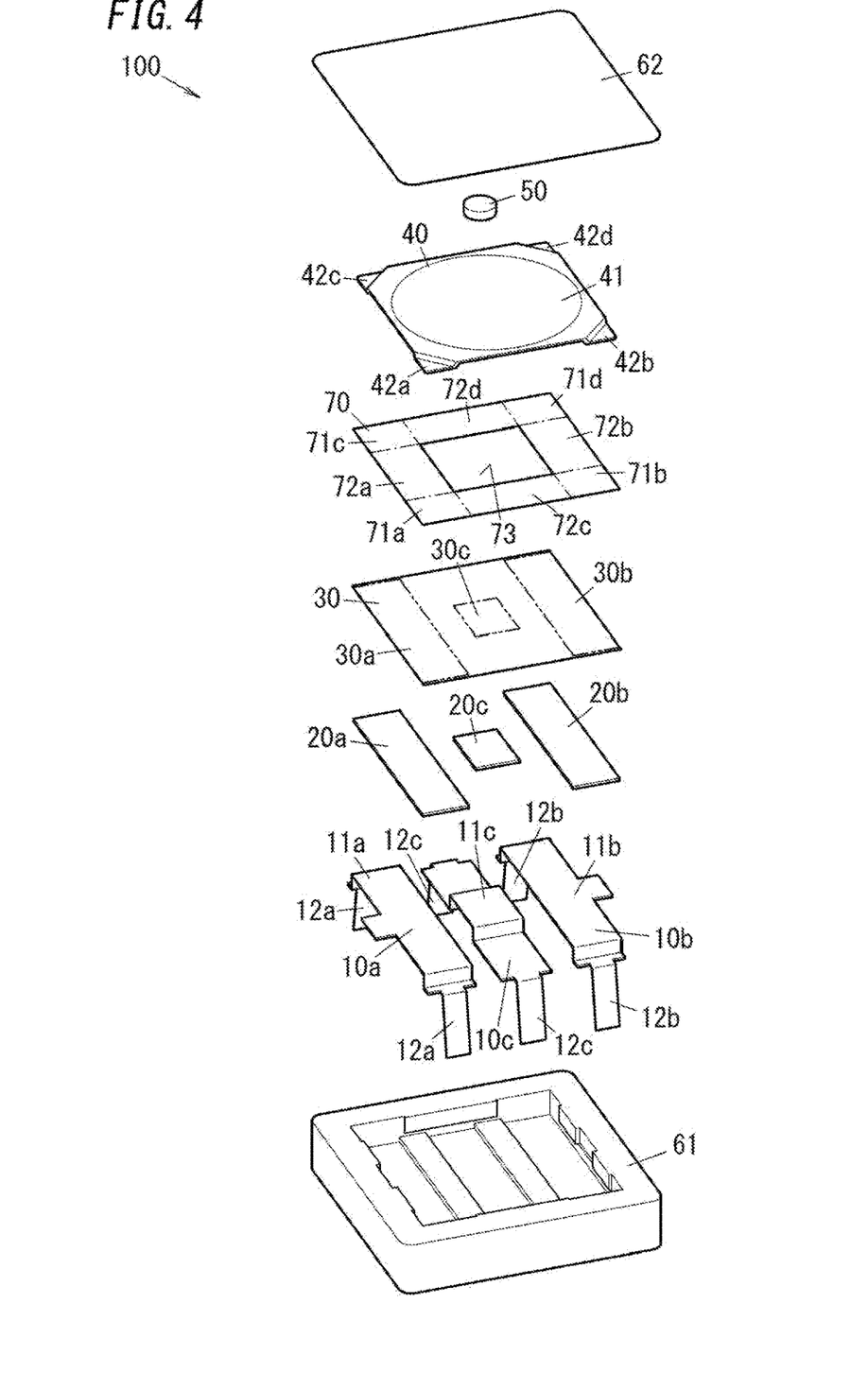
FIG. 4 is an exploded perspective view illustrating the input device.

As illustrated in FIG. 4, the input device 100 includes conductive members 10a, 10b, and 10c, elastic bodies 20a, 20b, and 20c, an insulating sheet 30, a feeling generating member 40, a pushing element 50, and a protector 70. The input device 100 further includes a housing 60 (FIG. 1 to see FIG. 4). In the following description, only to make the description easy to understand, the conductive members 10a, 10b, and 10c are referred to as first to third conductive members 10a, 10b, and 10c, and the elastic bodies 20a, 20b, and 20c are referred to as first to third elastic bodies 20a, 20b, and 20c as necessary.

As illustrated in FIGS. 2 and 3, the housing 60 accommodates the first to third conductive members 10a, 10b, and 10c, the first to third elastic bodies 20a, 20b, and 20c, the insulating sheet 30, the feeling generating member 40, the pushing element 50, and the protector 70. The housing 60 includes a body 61 and a cover 62. The body 61 has a flat quadrangular (e.g., square) box shape and has an opening in its first surface (upper surface in FIGS. 2 and 3) in a thickness direction thereof. The cover 62 has a quadrangular (e.g., square) flat plate shape. The cover 62 is attached to the first surface of the body 61 to cover the opening in the first surface of the body 61. The body 61 and the cover 62 have electrical insulation properties. For example, the body 61 and the cover 62 are made of a resin material having an electrical insulation property. In particular, the cover 62 is flexible. Thus, the feeling generating member 40 accommodated in the housing 60 can be pressed via the cover 62. A surface of the cover 62 away from the feeling generating member 40 is an operation area of the input device 100.

As illustrated in FIG. 4, the first conductive member 10a includes the electrode 11a and a pair of terminals 12a. The electrode 11a has a rectangular plate shape. The terminals 12a in the pair protrude from respective ends in a length direction of the electrode 11a. A direction in which the pair of terminals 12a protrude from the electrode 11a is a direction transverse to the length direction and a width direction of the electrode 11a. The second conductive member 10b includes the electrode 11b and a pair of terminals 12b. The electrode 11b has a rectangular plate shape. The terminals 12b in the pair protrude from respective ends in a length direction of the electrode 11b. A direction in which the pair of terminals 12b protrude from the electrode 11b is a direction transverse to the length direction and a width direction of the electrode 11b. The third conductive member 10c includes an electrode 11c and a pair of terminals 12c. The electrode 11c has a rectangular plate shape. In this embodiment, the electrode 11c has, in its length direction, a central part protruding in a thickness direction beyond both ends thereof. The terminals 12c in the pair protrude from respective ends in the length direction of the electrode 11c. A direction in which the pair of terminals 12c protrude from the electrode 11c is a direction transverse to the length direction and a width direction of the electrode 11c. The first to third conductive members 10a, 10b, and 10c may be formed from a metal plate material.

As illustrated in FIGS. 2 and 3, the first to third conductive members 10a to 10c are fixed to the body 61 by insert molding or the like. Here, in the first conductive member 10a, the electrode 11a is exposed from a bottom surface of the body 61, and the pair of terminals 12a protrude from a second surface (a lower surface in FIGS. 2 and 3) in the thickness direction of the body 61. In the second conductive member 10b, the electrode 11b is exposed from the bottom surface of the body 61, and the pair of terminals 12b protrude from the second surface in the thickness direction of the body 61. In the third conductive member 10c, the central part in the length direction of the electrode 11c is exposed from the bottom surface of the body 61, and the pair of terminals 12c protrude from the second surface in the thickness direction of the body 61.

As illustrated in FIG. 4, the first elastic body 20a has a rectangular plate shape. The first elastic body 20a has an outer shape which is substantially the same as the outer shape of the electrode 11a of the first conductive member 10a. The first elastic body 20a is disposed on the electrode 11a. The second elastic body 20b has a rectangular plate shape. The second elastic body 20b has an outer shape which is substantially the same as the outer shape of the electrode 11b of the second conductive member 10b. The second elastic body 20b is disposed on the electrode 11b. The third elastic body 20c has a rectangular plate shape. The third elastic body 20c has an outer shape which is substantially the same as the outer shape of the central part in the length direction of the electrode 11c of the third conductive member 10c. The third elastic body 20c is disposed on the central part in the length direction of the electrode 11c. In the present embodiment, the first to third elastic bodies 20a to 20c are electrically conductive.

Figure 5:
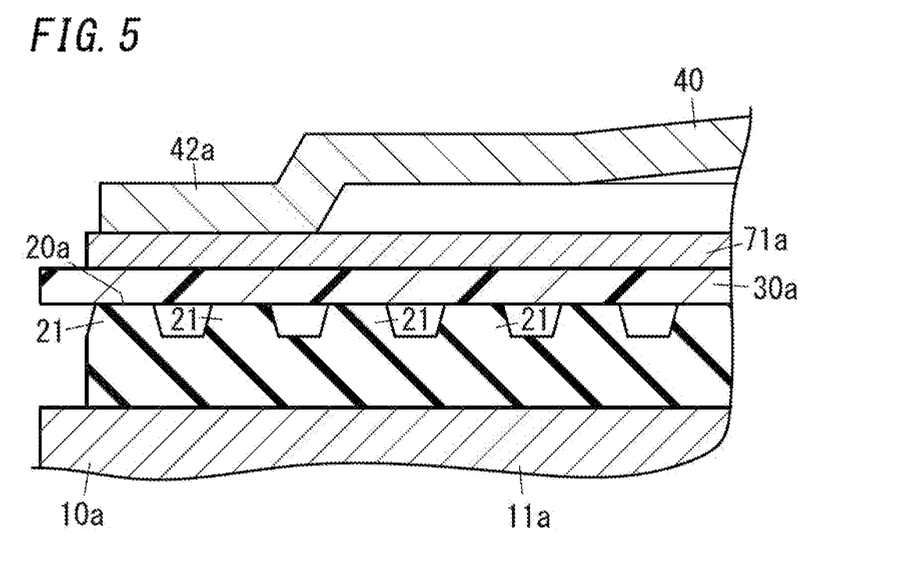
FIG. 5 is a partial enlarged view illustrating the input device in a state where the metal dome is not pressed.
Figure 6:
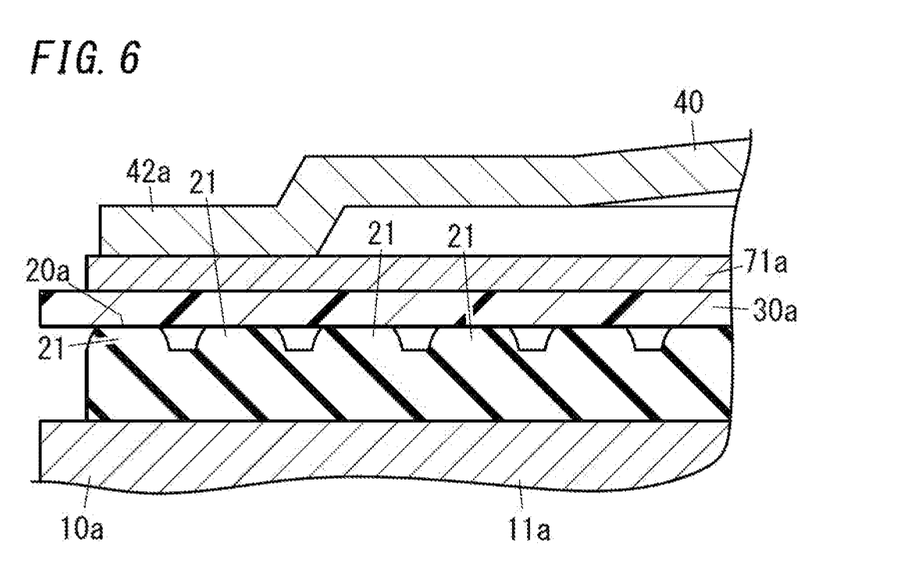
FIG. 6 is a partial enlarged view illustrating the input device in a state where the metal dome is pressed.

Moreover, a first surface in a thickness direction of the first elastic body 20a is a rough surface, and a second surface in the thickness direction of the first elastic body 20a is a flat surface. For example, the first surface in the thickness direction of the first elastic body 20a has a plurality of projections 21 as illustrated in FIGS. 5 and 6. Similarly, respective first surfaces in thickness directions of the second and third elastic bodies 20b and 20c are rough surfaces, and respective second surfaces in the thickness directions of the second and third elastic bodies 20b and 20c are flat surfaces. The first elastic body 20a is disposed on the electrode 11a such that the first surface faces away from the electrode 11a. In a similar manner, the second and third elastic bodies 20b and 20c are respectively disposed on the electrodes 11b and 11c such that the first surfaces face away from the electrodes 11b and 11c.

The insulating sheet 30 is a quadrangular sheet-like (e.g., square) insulator (dielectric) as illustrated in FIG. 4. The insulating sheet 30 has such a size that collectively covers the first to third elastic bodies 20a, 20b, and 20c. The insulating sheet 30 includes insulators (first to third insulators) 30a, 30b, and 30c. The first insulator 30a is part of the insulating sheet 30 which covers the first elastic body 20a. The second insulator 30b is part of the insulating sheet 30 which covers the second elastic body 20b. The third insulator 30c is part of the insulating sheet 30 which covers the third elastic body 20c. In the present embodiment, the insulating sheet 30 is thinner than each of the elastic bodies 20a and 20b.

Figure 7:
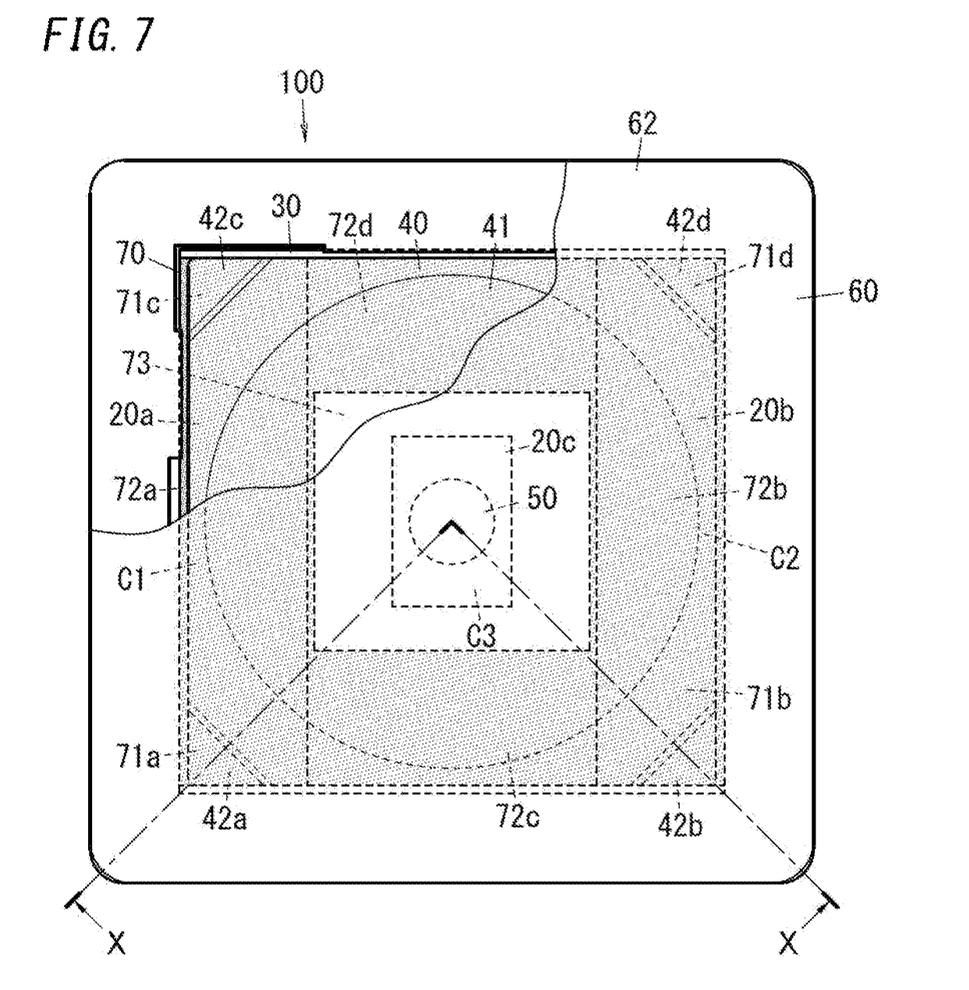
FIG. 7 is a plan view illustrating the input device.

As illustrated in FIGS. 4 and 7, the feeling generating member 40 has a quadrangular (e.g., square) plate shape as a whole. The feeling generating member 40 has a central part provided with a clicking part (an elastic deformation part) 41. The feeling generating member 40 is made of an elastic material (e.g., a metal plate). The feeling generating member 40 is a so-called metal dome. The clicking part 41 has a plate shape. In particular, the clicking part 41 is a dome-shaped plate. One surface (an upper surface in FIG. 5) in a thickness direction of the clicking part 41 is a convex surface and forms a press surface 41b. As the press surface 41b of the clicking part 41 is pressed, the clicking part 41 elastically deforms as illustrated in FIG. 3, thereby generating a clicking feeling. Specifically, the elastic deformation inverts the central part of the clicking part 41 from a convex state to a concave state. As described above, when the press surface 41b is pressed, the press surface 41b elastically deforms to be concave, and thereby, the clicking part 41 generates the clicking feeling. Moreover, the feeling generating member 40 has four corners provided with legs (first to fourth legs) 42a to 42d. The first to fourth leg 42a to 42d are arranged to surround the clicking part 41 to support the clicking part 41. The first to fourth legs 42a to 42d protrude in a direction opposite to a direction in which the clicking part 41 protrudes. As illustrated in FIG. 7, the first and third legs 42a and 42c are arranged on the first elastic body 20a. The second and the fourth legs 42b and 42d are arranged on the second elastic body 20b.

The pushing element 50 is a member that facilitates the occurrence of the elastic deformation of the clicking part 41 of the feeling generating member 40. As illustrated in FIG. 4, the pushing element 50 has a disk shape. Moreover, the pushing element 50 has an outer shape which is smaller than the outer shape of the clicking part 41 of the feeling generating member 40. As illustrated in FIG. 2, the pushing element 50 is disposed between the cover 62 and the central part of the press surface 41b of the feeling generating member 40. The pushing element 50 is fixed to the cover 62 or the feeling generating member 40. In particular, the pushing element 50 is desirably fixed to the cover 62. Note that the pushing element 50 has an electrical insulation property.

The protector 70 is a member that protects the elastic bodies 20a and 20b. As illustrated in FIGS. 2 to 4, the protector 70 is disposed between the feeling generating member 40 and the elastic bodies 20a and 20b, more specifically, between the insulating sheet 30 and the feeling generating member 40. The protector 70 has an opening at a location facing the clicking part 41. Specifically, the protector 70 has a frame shape having an opening 73 as illustrated in FIG. 4 and has both flat surfaces in a thickness direction thereof. In particular, the protector 70 has a rectangular (square) frame shape. The opening 73 of the protector 70 is formed so that the protector 70 does not obstruct contact between the clicking part 41 and the third insulator 30c. As illustrated in FIGS. 4 and 7, the protector 70 includes protection members (first to fourth protection members) 71a to 71d and connection members (first to fourth connection members) 72a to 72d. Note that in FIG. 7, in order to promote understanding, the protector 70 is expressly shown with a dot-halftone pattern. The first to fourth protection members 71a to 71d are rectangular portions corresponding to the respective four corners of the protector 70. In particular, the plurality of protection members 71a to 71d are portions of the protector 70 and respectively support the plurality of legs 42a to 42d of the feeling generating member 40. Each of the first to fourth connection members 72a to 72d has a rectangular shape. In particular, the first connection member 72a integrally connects the first and third protection members 71a and 71c to each other. The second connection member 72b integrally connects the second and fourth protection members 71b and 71d to each other. The third connection member 72c integrally connects the first and second protection members 71a and 71b to each other. The fourth connection member 72d integrally connects the third and fourth protection members 71c and 71d to each other. In the present embodiment, the protector 70 is electrically conductive. For example, the protector 70 is made of an electrically conductive material (e.g., metal).

In the input device 100, the conductive members 10a and 10b, the elastic bodies 20a and 20b, the insulating sheet 30, the feeling generating member 40, and the protector 70 form the pressure detectors (the first and second pressure detectors) C1 and C2. The pressure detectors (the first and second pressure detectors) C1 and C2 detect pressing force applied to the press surface 41b of the feeling generating member 40. Specifically, the pressure detectors (the first and second pressure detectors) C1 and C2 support the feeling generating member 40 at a side of a concave surface 41a of the feeling generating member 40 and detect the pressing force applied to the press surface 41b of the feeling generating member 40. Each of the pressure detectors (the first and second pressure detectors) C1 and C2 is a capacitive pressure sensor.

Specifically, as illustrated in FIGS. 2 and 3, the first pressure detector C1 includes the electrode 11a of the first conductive member 10a, the elastic body 20a, the insulator 30a, the legs 42a and 42c of the feeling generating member 40, and the protector 70 (the protection members 71a and 71c and the connection member 72a). That is, in the first pressure detector C1, the legs (the first and third legs) 42a and 42c, which are supported by the electrode 11a, of the feeling generating member 40 are pressing members arranged on an opposite side of the elastic body 20a from the electrode 11a. In the following description, the legs 42a and 42c may be referred to as pressing members 42a and 42c as necessary.

The first pressure detector C1 includes the electrode 11a, the elastic body (the first elastic body) 20a, the pressing members 42a and 42c, and the protection members 71a and 71c. The first pressure detector C1 further includes the insulator (the first insulator) 30a between the elastic body (the first elastic body) 20a and the protection members 71a and 71c. Here, the first elastic body 20a is disposed on the electrode 11a such that the first surface faces away from the electrode 11a. Thus, the surface (the first surface), which faces the pressing members 42a and 42c, of the first elastic body 20a is a rough surface provided with the plurality of projections 21. Therefore, as illustrated in FIG. 3, when the first elastic body 20a is pressed by the feeling generating member 40 (the pressing members 42a and 42c), the plurality of projections 21 are crushed. Thus, the entire thickness of the first elastic body 20a decreases, but simultaneously, the contact area between the first elastic body 20a and the first insulator 30a increases. Thus, simply as compared to a case where the thickness of the first elastic body 20a changes, the linearity of a change in electrostatic capacitance with respect to pressing force applied to the first pressure detector C1 is improved. In particular, between the first insulator 30a and the pressing members 42a and 42c, the protection members 71a and 71c are provided. The protection members 71a and 71c have higher strength than the first elastic body 20a. Therefore, the pressing force from the pressing members 42a and 42c may be dispersedly, but not locally, applied to the first elastic body 20a and the first insulator 30a. This reduces the possibility that the pressing members 42a and 42c applies excessive force (pressure, pressing force) to the first elastic body 20a and the first insulator 30a. Thus, the occurrence of plastic deformation and deterioration of the electrical characteristics of the elastic body 20a can be reduced. The occurrence of plastic deformation and the deterioration of the electrical characteristics of the elastic body 20a may degrade the performance of the input device 100. Thus, according to the input device 100, the degradation of the performance can be reduced. Further, the protection members 71a and 71c are respectively larger than the pressing members 42a and 42c in plan view. Moreover, the protection members 71a and 71c have flat surfaces (lower surfaces in FIGS. 2 and 3) at a side of the first elastic body 20a. In this case, an action from the feeling generating member 40 is easily added to the large number of projections 21 by the protection members 71a and 71c, and therefore, a configuration that provides a large change in the electrostatic capacitance is realized.

As illustrated in FIGS. 2 and 3, the second pressure detector C2 includes the electrode 11b of the second conductive member 10b, the elastic body 20b, the insulator 30b, the legs 42b and 42d of the feeling generating member 40, and the protector 70 (the protection members 71b and 71d and the connection member 72b). That is, in the second pressure detector C2, the second and fourth legs 42b and 42d, which are supported by the electrode 11b, of the feeling generating member 40 are pressing members arranged on an opposite side of the elastic body 20b from the electrode 11b. In the following description, the legs 42b and 42d may be referred to as pressing members 42b and 42d as necessary.

The second pressure detector C2 includes the electrode 11b, the elastic body (the second elastic body) 20b, the pressing members 42b and 42d, and the protection members 71b and 71d. Moreover, the second pressure detector C2 includes the insulator (the second insulator) 30b between the elastic body (second elastic body) 20b and the protection members 71b and 71d. Here, the second elastic body 20b is disposed on the electrode 11b such that the first surface faces away from the electrode 11b. Thus, the surface (the first surface), which faces the pressing members 42b and 42d, of the second elastic body 20b is a rough surface provided with a plurality of projections 21. Thus, the linearity of a change in electrostatic capacitance with respect to pressing force applied to the second pressure detector C2 is improved. In particular, the protection member 71b is provided between the second insulator 30b and the pressing member 42b, and the protection member 71d is provided between the second insulator 30b and the pressing member 42d. The protection members 71b and 71d have higher strength than the second elastic body 20b. Therefore, the pressing force from the pressing members 42b and 42d may be dispersedly, but not locally, applied to the second elastic body 20b and the second insulator 30b. Thus, the occurrence of plastic deformation and deterioration of the electrical characteristics of the elastic body 20b can be reduced. Thus, according to the input device 100, the degradation of the performance can be reduced. Further, the protection members 71b and 71d are respectively larger than the pressing members 42b and 42d in plan view. Furthermore, the protection members 71b and 71d have flat surfaces (lower surfaces in FIGS. 2 and 3) at a side of the second elastic body 20b. In this case, an action from the feeling generating member 40 is easily added to the large number of projections 21 by the protection members 71b and 71d, and therefore, a configuration that provides a large change in the electrostatic capacitance is realized.

Moreover, the third conductive member 10c, the third elastic body 20c, the insulating sheet 30, and the feeling generating member 40 in the input device 100 form a clicking detector C3 for detecting the elastic deformation (i.e., the occurrence of clicking) of the clicking part 41 of the feeling generating member 40. The clicking detector C3 is located at a side of the concave surface 41a of the feeling generating member 40 and detects the elastic deformation of the feeling generating member 40 (the clicking part 41) when the convex surface (press surface 41b) of the feeling generating member 40 is pressed. The clicking detector C3 is a capacitive pressure sensor.

The clicking detector C3 includes the electrode 11c of the third conductive member 10c, the third elastic body 20c, the third insulator 30c, and the clicking part 41 of feeling generating member 40. Here, the third elastic body 20c has a plurality of projections in a similar manner to the first elastic body 20a. Thus, the linearity of a change in electrostatic capacitance with respect to pressing force applied to the clicking detector C3 is improved.

1.1.3 Operation

Next, operation of the input device 100 will be briefly described.

First, an example will be described in which the central part (which is a portion corresponding to the clicking detector C3) of the feeling generating member 40 is pressed. The first and second pressure detectors C1 and C2 support the feeling generating members 40 and are located on opposite sides of a central axis of the feeling generating member 40 in a prescribed direction (the rightward/leftward direction in FIGS. 2 and 3) transverse to the central axis of the feeling generating member 40. Thus, when the central part of the feeling generating member 40 is pressed, pressure is substantially uniformly applied to the first and second pressure detectors C1 and C2. Thus, as a pressing amount (stroke) of the feeling generating member 40 increases, electrostatic capacitances of the first and second pressure detectors C1 and C2 increase. In contrast, since the clicking detector C3 does not support the feeling generating member 40, the change in the electrostatic capacitance in the clicking detector C3 is smaller than in the first and second pressure detectors C1 and C2. When the pressing amount (stroke) of the feeling generating member 40 increases and reaches a specified value, the clicking part 41 of the feeling generating member 40 elastically deforms, thereby generating a clicking feeling. When elastically deforms, the clicking part 41 of the feeling generating member 40 comes into contact with the third insulator 30c as illustrated in FIG. 3. That is, the elastic deformation of the clicking part 41 largely changes the distance between the central part of the clicking part 41 and the electrode 11c. Such a large change in distance appears as a large change in the electrostatic capacitance of the clicking detector C3.

Next, an example will be described in which a first end (a left portion in FIG. 2, a portion corresponding to the first pressure detector C1) in the prescribed direction of the feeling generating member 40 is pressed. As described above, the first and second pressure detectors C1 and C2 support the feeling generating members 40 and are located on the opposite sides of the central axis of the feeling generating member 40 in the prescribed direction transverse to the central axis of the feeling generating member 40. Therefore, when the portion corresponding to the first pressure detector C1 of the feeling generating member 40 is pressed, larger pressure is applied to the first pressure detector C1 than to the second pressure detector C2. As the pressing amount (stroke) of the feeling generating member 40 increases, the electrostatic capacitances of the first and second pressure detectors C1 and C2 increase, but a change in the electrostatic capacitance of the first pressure detector C1 becomes larger than a change in the electrostatic capacitance of the second pressure detector C2. In contrast, when the a second end (a right portion in FIG. 2, a portion corresponding to the second pressure detector C2) in the prescribed direction of the feeling generating member 40 is pressed, the change in the electrostatic capacitance in the second pressure detector C2 becomes larger than the change in the electrostatic capacitance of the first pressure detector C1. Thus, the input device 100 can detect, in the feeling generating member 40, a site pressed by a user in the prescribed direction transverse to the central axis of the feeling generating member 40.

Here, each of the first and second pressure detectors C1 and C2 and the clicking detector C3 is a capacitive pressure sensor and is thus applicable as a proximity sensor to an object (e.g., fingers of a user) at a ground potential. In this case, a simulated capacitor is used, which is formed between the object at the ground potential and the pressure sensors (the pressure detectors C1 and C2 and the clicking detector C3). For example, the input device 100 can detect that a user's finger is located in the vicinity of the feeling generating member 40 by the first and second pressure detectors C1 and C2 and the clicking detector C3.

Note that as a method for acquiring the electrostatic capacitances of the pressure sensors (the first and second pressure detectors C1 and C2 and the clicking detector C3), conventionally known various methods may be adopted. For example, a switched capacitor method may be used. In the switched capacitor method, (a change in) electrostatic capacitance of the pressure sensor is detected based on the amount of electric charges accumulated in a capacitor included in the pressure sensor. For example, the switched capacitor method alternately and repeatedly performs, during a predetermined time, a charge process of charging the pressure sensor (capacitor) and a discharge process of discharging the pressure sensor and charging a capacitor for determination with electric charges accumulated in the pressure sensor. When a voltage across the capacitor for determination reaches a specified value, the discharge process is ended, and the charge process is started. That is, as the electrostatic capacitance of the pressure sensor increases, the number of times that the voltage across the capacitor for the determination reaches the specified value within a predetermined time increases. Thus, a change in the electrostatic capacitance of the pressure sensor may be determined based on the number of times that the voltage across the capacitor for the determination reaches the specified value within the predetermined time.

1.1.4 Usage

Next, usage of the input device 100 will be described. First, according to the input device 100, a pressing site (tilt) in the prescribed direction of the feeling generating member 40 may be determined based on a balance of the change in the electrostatic capacitances of the first and second pressure detectors C1 and C2. The balance of the change in the electrostatic capacitances of the first and second pressure detectors C1 and C2 is evaluated based on the magnitude relationship of the change in the electrostatic capacitances of the first and second pressure detectors C1 and C2. In addition to the pressing site (tilt) in the prescribed direction of the feeling generating member 40, the extent of pressing (pressing amount) may also be determined based on the balance of the change in the electrostatic capacitances of the first and second pressure detectors C1 and C2. For example, when the change in the electrostatic capacitances of the first and second pressure detectors C1 and C2 is large, it is assumed that the pressing amount is large. Thus, the pressing amount may be determined in accordance with the change in the electrostatic capacitances of the first and second pressure detectors C1 and C2.

Moreover, whether or not the clicking part 41 is elastically deformed (whether or not a clicking feeling is generated) may be determined based on a change in the electrostatic capacitance of the clicking detector C3. Moreover, the change in the electrostatic capacitances caused due to the elastic deformation of the feeling generating member 40 is observed also in the first and second pressure detectors C1 and C2. The generation of the clicking feeling may thus be detected by the first and second pressure detectors C1 and C2. In this case, the input device 100 does not have to include the clicking detector C3.

Moreover, whether or not a detection target (e.g., user's finger) exists in the vicinity of the feeling generating member 40 may be determined based on a change in electrostatic capacitances of the first and second pressure detectors C1 and C2 and the clicking detector C3.

1.2 Second Embodiment

Figure 8:
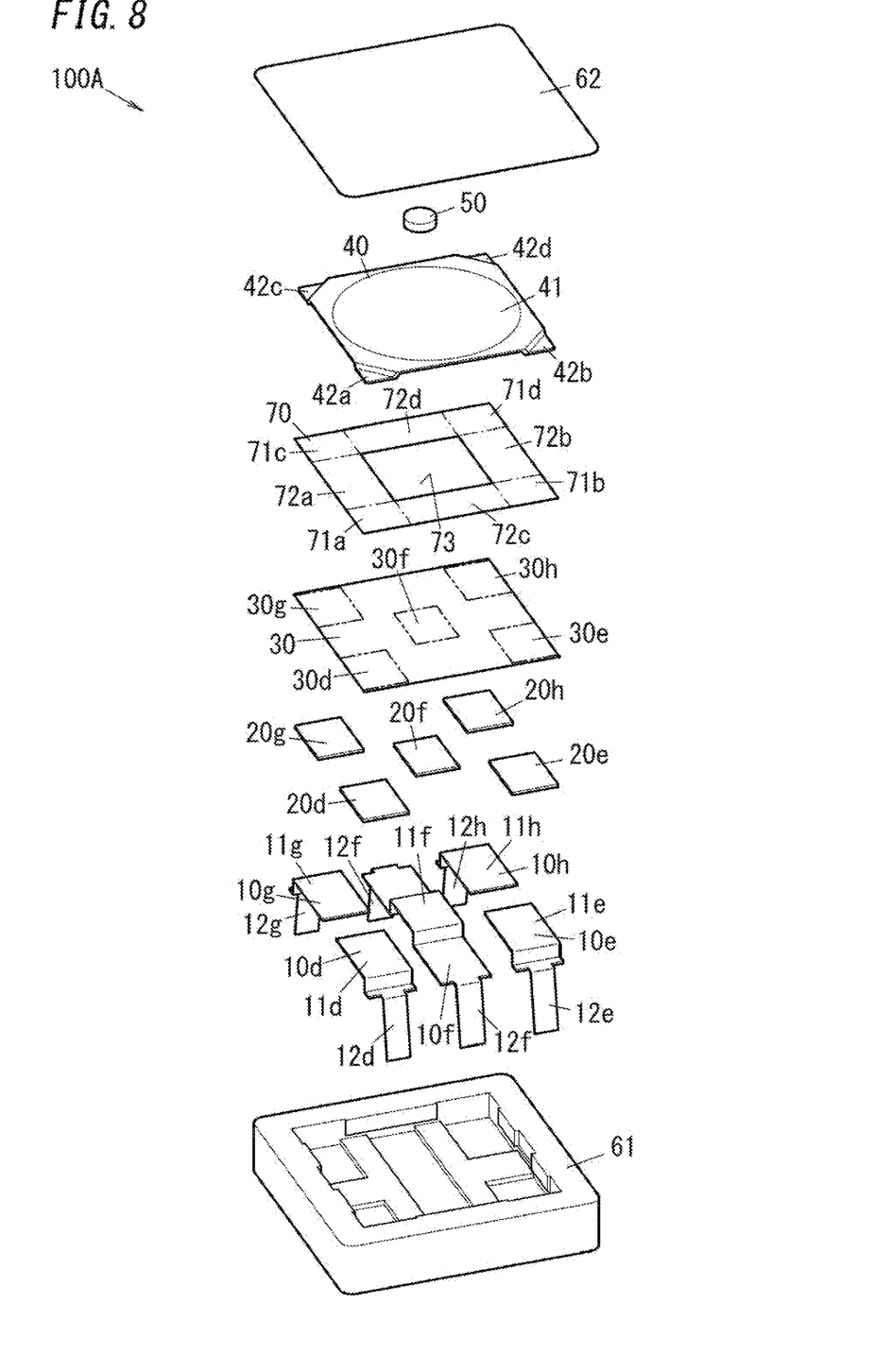
FIG. 8 is an exploded perspective view illustrating an input device of a second embodiment.
Figure 9:
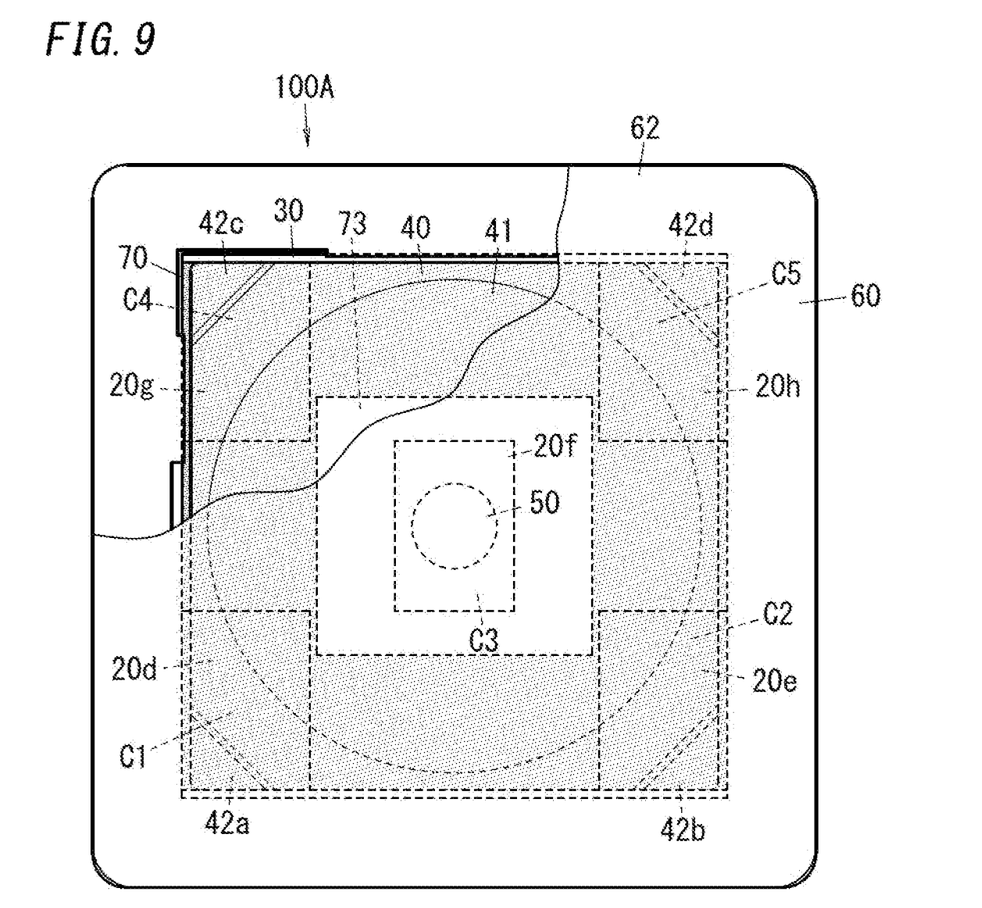
FIG. 9 is a plan view illustrating the input device of the second embodiment.

FIGS. 8 and 9 show an input device 100A of the present embodiment. The input device 100A includes a third and fourth pressure detectors C4 and C5 in addition to the first and second pressure detectors C1 and C2.

The input device 100A will be described below with reference to FIGS. 8 and 9 in further detail. As illustrated in FIG. 8, the input device 100A includes conductive members 10$d$ to 10$h$, elastic bodies 20$d$ to 20$h$, an insulating sheet 30, a feeling generating member 40, a pushing element 50, and a protector 70. The input device 100A further includes a housing 60 (see FIG. 9). In the following description, only to make the description easy to understand, the conductive members 10$d$ to 10$h$ are referred to as first to fifth conductive members 10$d$ to 10$h$ and the elastic bodies 20$d$ to 20$h$ are referred to as first to fifth elastic bodies 20$d$ to 20$h$ as necessary.

As illustrated in FIG. 8, the first conductive member 10$d$ includes the electrode 11$d$ and a terminal 12$d$. The electrode 11$d$ has a rectangular plate shape. The terminal 12$d$ protrudes from one end in a length direction of the electrode 11$d$. A direction in which the terminal 12$d$ protrudes from the electrode 11$d$ is a direction transverse to the length direction and a width direction of the electrode 11$d$. The second, fourth, and fifth conductive members 10$e$, 10$g$, and 10$h$ each have the same shape as the first conductive member 10$d$ and respectively include electrodes 11$e$, 11$g$, and 11$h$ and terminals 12$e$, 12$g$, and 12$h$. The third conductive member 10$f$ has the same shape as the third conductive member 10$c$ of the input device 100 and includes an electrode 11$f$ and a pair of terminals 12$f$. The first to fifth conductive members 10$d$ to 10$h$ may be made of metal plate material.

The first to fifth conductive members 10$d$ to 10$h$ are fixed to a body 61 by insert molding or the like. Here, the electrodes 11$d$, 11$e$, 11$g$, and 11$h$ respectively of the first, second, fourth, and fifth conductive members 10$d$, 10$e$, 10$g$, and 10$h$ are exposed from four corners of a bottom surface of the body 61. In contrast, the electrode 11$f$ of the third conductive member 10$f$ has a central part exposed from the center of the bottom surface of the body 61. The terminals 12$d$, 12$e$, 12$g$, and 12$h$ respectively of the first, second, fourth, and fifth conductive members 10$d$, 10$e$, 10$g$, and 10$h$ and the pair of terminals 12$f$ of third conductive member 10$f$ protrude from a second surface in a thickness direction of the body 61.

As illustrated in FIG. 8, the first to fifth elastic bodies 20$d$ to 20$h$ each have a rectangular plate shape. The first, second, fourth, and fifth elastic bodies 20$d$, 20$e$, 20$g$, and 20$h$ each have an outer shape substantially the same as the outer shape of the electrodes 11$d$, 11$e$, 11$g$, and 11$h$ respectively. The first, second, fourth, and fifth elastic bodies 20$d$, 20$e$, 20$g$, and 20$h$ are respectively disposed on the electrodes 11$d$, 11$e$, 11$g$, and 11$h$. The third elastic body 20$f$ has an outer shape which is substantially the same as the outer shape of the central part in the length direction of the electrode 11$f$ of the third conductive member 10$f$. The third elastic body 20$f$ is disposed on the central part in the length direction of the electrode 11*f*. In the present embodiment, the first to fifth elastic bodies 20*d* to 20*h* are electrically conductive. Moreover, a first surface in a thickness direction of each of the first to fifth elastic bodies 20*d* to 20*h* is a rough surface, and a second surface in the thickness direction is a flat surface. For example, the first surface in the thickness direction of each of the first to fifth elastic bodies 20*d* to 20*h* has a plurality of projections 21 (FIGS. 5 and 6) in a similar manner to the first elastic body 20*a* of the input device 100.

As illustrated in FIG. 8, the insulating sheet 30 has such a size that collectively covers the first to fifth elastic bodies 20*d* to 20*h*. The insulating sheet 30 includes (first to fifth) insulators 30*d* to 30*h*. The first insulator 30*d* is part of the insulating sheet 30 which covers the first elastic body 20*d*. The second insulator 30*e* is part of the insulating sheet 30 which covers the second elastic body 20*e*. The third insulator 30*f* is part of the insulating sheet 30 which covers the third elastic body 20*f*. The fourth insulator 30*g* is part of the insulating sheet 30 which covers the fourth elastic body 20*g*. The fifth insulator 30*h* is part of the insulating sheet 30 which covers the fifth elastic body 20*h*. In the present embodiment, the insulating sheet 30 is thinner than each of the elastic bodies 20*d*, 20*e*, 20*g*, and 20*h*.

The feeling generating member 40 includes a clicking part 41 and legs (first to fourth legs) 42*a* to 42*d* in a similar manner to the first embodiment. As illustrated in FIG. 9, the first to fourth leg 42*a*, 42*b*, 42*c*, and 42*d* are respectively disposed on the first to fourth elastic bodies 20*d*, 20*e*, 20*g*, and 20*h*.

In a similar manner to the first embodiment, the protector 70 includes protection members (first to fourth protection members) 71*a* to 71*d* and connection members (first to fourth connection members) 72*a* to 72*d* (see FIGS. 8 and 9). In the present embodiment, the plurality of protection members 71*a* to 71*d* are also portions of the protector 70 and respectively support the plurality of legs 42*a* to 42*d* of the feeling generating member 40. Note that in FIG. 9, in order to promote understanding, the protector 70 is expressly shown with a dot-halftone pattern.

In the input device 100A, the conductive members 10*d*, 10*e*, 10*g*, and 10*h*, the elastic bodies 20*d*, 20*e*, 20*g*, and 20*h*, the insulating sheet 30, the feeling generating member 40, and the protector 70 form the pressure detectors C1, C2, C4, and C5 respectively. The pressure detectors (the first, second, third, and fourth pressure detectors) C1, C2, C4, and C5 detect pressing force applied to the press surface 41*b* of the feeling generating member 40. Specifically, the pressure detectors C1, C2, C4, and C5 support the feeling generating member 40 at a side of a concave surface 41*a* of the feeling generating member 40 and detect the pressing force applied to the press surface 41*b* of the feeling generating member 40. Each of the pressure detectors C1, C2, C4, and C5 is a capacitive pressure sensor.

Specifically, the pressure detector C1 includes the electrode 11*d*, the elastic body 20*d*, the insulator 30*d*, the leg 42*a*, and the protection member 71*a*, and the pressure detector C2 includes the electrode 11*e*, the elastic body 20*e*, the insulator 30*e*, the leg 42*b*, and the protection member 71*b*. The pressure detector C4 includes the electrode 11*g*, the elastic body 20*g*, the insulator 30*g*, the leg 42*c*, and the protection member 71*c*, and the pressure detector C5 includes the electrode 11*h*, the elastic body 20*h*, the insulator 30*h*, the leg 42*d*, and the protection member 71*d*. That is, in the first pressure detector C1, the first leg 42*a*, which is supported by the electrode 11*d*, of the feeling generating member 40 is a pressing member disposed on an opposite side of the elastic body 20*d* from the electrode 11*d*. In the second pressure detector C2, the second leg 42*b*, which is supported by the electrode 11*e*, of the feeling generating member 40 is a pressing member disposed on an opposite side of the elastic body 20*e* from the electrode 11*e*. In the third pressure detector C3, the third leg 42*c*, which is supported by the electrode 11*g*, of the feeling generating member 40 is a pressing member disposed on an opposite side of the elastic body 20*g* from the electrode 11*g*. In the fourth pressure detector C4, the fourth leg 42*d*, which is supported by the electrode 11*h*, of the feeling generating member 40 is a pressing member disposed on an opposite side of the elastic body 20*h* from the electrode 11*h*. In the following description, the legs 42*a* to 42*d* may be referred to as pressing members 42*a* to 42*d* as necessary.

That is, the first pressure detector C1 includes the electrode 11*d*, the elastic body (the first elastic body) 20*d*, the pressing member (first pressing member) 42*a*, and the protection member (first protection member) 71*a*. The first pressure detector C1 further includes the insulator (the first insulator) 30*d* between the elastic body (the first elastic body) 20*d* and the protection member 71*a*. Here, the first elastic body 20*d* is disposed on the electrode 11*d* such that the first surface faces away from the electrode 11*d*. Thus, the surface (the first surface), which faces the pressing member 42*a*, of the first elastic body 20*d* is a rough surface provided with the plurality of projections 21. Thus, the linearity of a change in electrostatic capacitance with respect to pressing force applied to the first pressure detector C1 is improved. In particular, the protection member 71*a* is provided between the first insulator 30*d* and the pressing member 42*a*. The protection member 71*a* has higher strength than the first elastic body 20*d*. Thus, the pressing force from the pressing member 42*a* may be dispersedly, but not locally, applied to the first elastic body 20*d* and the first insulator 30*d*. This reduces the possibility that the pressing member 42*a* applies excessive force (pressure, pressing force) to the first elastic body 20*d* and the first insulator 30*d*. Thus, according to the input device 100A, the degradation of the performance can be reduced.

Moreover, the second pressure detector C2 includes the electrode 11*e*, the elastic body (the second elastic body) 20*e*, the pressing member (the second pressing member) 42*b*, and the protection member (the second protection member) 71*b*. The second pressure detector C2 further includes the insulator (the second insulator) 30*e* between the elastic body (the second elastic body) 20*e* and the protection member 71*b*. The second elastic body 20*e* is disposed on the electrode 11*e* such that the first surface faces away from the electrode 11*e*. Thus, the surface (the first surface), which faces the pressing member 42*b* of the second elastic body 20*e*, is a rough surface provided with the plurality of projections 21. The linearity of a change in electrostatic capacitance with respect to pressing force applied to the second pressure detector C2 is improved. In particular, the protection member 71*b* is provided between the second insulator 30*e* and the pressing member 42*b*. The protection member 71*b* has higher strength than the second elastic body 20*e*. Thus, the pressing force from the pressing member 42*b* may be dispersedly, but not locally, applied to the second elastic body 20*e* and the second insulator 30*e*. This reduces the possibility that the pressing member 42*b* applies excessive force (pressure, pressing force) to the second elastic body 20*e* and the second insulator 30*e*. Thus, according to the input device 100A, the degradation of the performance can be reduced.

Moreover, the third pressure detector C4 includes the electrode 11*g*, the elastic body (the third elastic body) 20*g*, the pressing member (the third pressing member) 42*c*, and the protection member (the third protection member) 71c. The third pressure detector C4 further includes the insulator (the third insulator) 30g between the elastic body (third elastic body) 20g and the protection member 71c. The third elastic body 20g is disposed on the electrode 11g such that the first surface faces away from the electrode 11g. Thus, the surface (the first surface), which faces the pressing member 42c of the third elastic body 20g, is a rough surface provided with the plurality of projections 21. The linearity of a change in electrostatic capacitance with respect to pressing force applied to the third pressure detector C4 is improved. In particular, the protection member 71c is provided between the third insulator 30g and the pressing member 42c. The protection member 71c has higher strength than the third elastic body 20g. Thus, the pressing force from the pressing member 42c may be dispersedly, but not locally, applied to the third elastic body 20g and the third insulator 30g. This reduces the possibility that the pressing member 42c applies excessive force (pressure, pressing force) to the third elastic body 20g and the third insulator 30g. Thus, according to the input device 100A, the degradation of the performance can be reduced.

Moreover, the fourth pressure detector C5 includes the electrode 11h, the elastic body (the fourth elastic body) 20h, the pressing member (the fourth pressing member) 42d, and the protection member (the fourth protection member) 71d. The fourth pressure detector C5 further includes the insulator (the fourth insulator) 30h between the elastic body (the fourth elastic body) 20h and the protection member 71d. The fourth elastic body 20h is disposed on the electrode 11h such that the first surface faces away from the electrode 11h. Thus, the surface (the first surface), which faces the pressing member 42d, of the fourth elastic body 20h is a rough surface provided with the plurality of projections 21. The linearity of a change in electrostatic capacitance with respect to pressing force applied to the fourth pressure detector C5 is improved. In particular, the protection member 71d is provided between the fourth insulator 30h and the pressing member 42d. The protection member 71d has higher strength than the fourth elastic body 20h. Thus, the pressing force from the pressing member 42d may be dispersedly, but not locally, applied to the fourth elastic body 20h and the fourth insulator 30h. This reduces the possibility that the pressing member 42d applies excessive force (pressure, pressing force) to the fourth elastic body 20h and the fourth insulator 30h. Thus, according to the input device 100A, the degradation of the performance can be reduced.

Each of the first to fourth pressure detectors C1, C2, C4, and C5 is a pressure sensor that supports the feeling generating member 40 at a side of the concave surface 41a of the feeling generating member 40. As illustrated in FIG. 9, in a (first) prescribed direction (rightward/leftward direction in FIG. 9) transverse to the central axis of the feeling generating member 40, the first pressure detector C1 and the second pressure detector C2 are located on opposite sides of the central axis of the feeling generating member 40. In contrast, in a second prescribed direction transverse to the central axis of the feeling generating member 40 and the first prescribed direction, the first pressure detector C1 and the second pressure detector C2 are located on the same side of the central axis of the feeling generating member 40. In the present embodiment, the second prescribed direction is a direction which is orthogonal to the central axis of the feeling generating member 40 and the first prescribed direction and in which the first leg 42a and the third leg 42c (or, the second leg 42b and the fourth leg 42d) are aligned to each other. That is, the second prescribed direction is the upward/downward direction in FIG. 9. Similarly, in the first prescribed direction (the rightward/leftward direction in FIG. 9), the third pressure detector C4 and the fourth pressure detector C5 are located on opposite sides of the central axis of the feeling generating member 40. In contrast, in the second prescribed direction (the upward/downward direction in FIG. 9), the third pressure detector C4 and the fourth pressure detector C5 are located on the same side as the central axis of the feeling generating member 40.

The clicking detector C3 includes the electrode 11f of the third conductive member 10f, the third elastic body 20f, the third insulator 30f, and the clicking part 41 of feeling generating member 40.

The clicking detector C3 is a capacitive pressure sensor similar to the pressure detectors C1, C2, C4, and C5. However, unlike the pressure detectors C1, C2, C4, and C5, the clicking detector C3 is not a pressure sensor that supports the feeling generating member 40 at the side of the concave surface 41a of the feeling generating member 40. In a similar manner to the first embodiment, the clicking detector C3 is located at the side of the concave surface 41a of the feeling generating member 40 and detects the elastic deformation of the feeling generating member 40 (the clicking part 41) when the convex surface (the press surface 41b) of the feeling generating member 40 is pressed.

The input device 100A described above includes the first to fourth pressure detectors C1, C2, C4, and C5 and the clicking detector C3. Each of the first to fourth pressure detectors C1, C2, C4, and C5 and the clicking detector C3 is a capacitive pressure sensor and is thus applicable as a proximity sensor to an object (e.g., fingers of a user) at a ground potential. For example, the input device 100A can detect that a user's finger is located in the vicinity of the feeling generating member 40 by the first to fourth pressure detectors C1, C2, C4, and C5 and the clicking detector C3.

Moreover, the input device 100A is configured to detect the pressing amount (stroke) of the feeling generating member 40.

When a central part of the feeling generating member 40 is pressed, pressure is substantially uniformly applied to the first to fourth pressure detectors C1, C2, C4, and C5. Thus, as the pressing amount (stroke) of the feeling generating member 40 increases, electrostatic capacitances of the first to fourth pressure detectors C1, C2, C4, and C5 increase. In contrast, since the clicking detector C3 does not support the feeling generating member 40, a change in the electrostatic capacitance of the clicking detector C3 is smaller than that of each of the first to fourth pressure detectors C1, C2, C4, and C5. When the clicking part 41 of the feeling generating member 40 elastically deforms and a clicking feeling is generated, a large change appears in the electrostatic capacitance of the clicking detector C3.

When a first end (a left portion in FIG. 9, a portion corresponding to the first and third pressure detectors C1 and C4) in the first prescribed direction (the rightward/leftward direction in FIG. 9) of the feeling generating member 40 is pressed, a larger pressure is applied to the first pressure detector C1 than to the second pressure detector C2. Moreover, a larger pressure is applied to the third pressure detector C4 than to the fourth pressure detector C5. In contrast, when a second end (a right portion in FIG. 9, a portion corresponding to the second and fourth pressure detectors C2 and C5) in the first prescribed direction (the rightward/leftward direction in FIG. 9) of the feeling generating member 40 is pressed, a larger pressure is applied to the second pressure detector C2 than to the first pressure detector C1. Moreover, a larger pressure is applied to the fourth pressure detector C5 than to the third pressure detector C4. Such a difference in the pressure is detectable based on a change in the electrostatic capacitances of the first to fourth pressure detectors C1, C2, C4, and C5. Thus, the input device 100A can detect a location of the feeling generating member 40 pressed by a user in the first prescribed direction of the feeling generating member 40.

Moreover, when a first end (a lower portion in FIG. 9, a portion corresponding to the first and second pressure detectors C1 and C2) in the second prescribed direction (the upward/downward direction in FIG. 9) of the feeling generating member 40 is pressed, a larger pressure is applied to the first pressure detector C1 than to the third pressure detector C4. Moreover, a larger pressure is applied to the second pressure detector C2 than to the fourth pressure detector C5. In contrast, when a second end (an upper portion in FIG. 9, a portion corresponding to the third and fourth pressure detectors C4 and C5) in the second prescribed direction (the upward/downward direction in FIG. 9) of the feeling generating member 40 is pressed, a larger pressure is applied to the third pressure detector C4 than to the first pressure detector C1. Moreover, a larger pressure is applied to the fourth pressure detector C5 than to the second pressure detector C2. Such a difference in the pressure is detectable based on the change in the electrostatic capacitances of the first to fourth pressure detectors C1, C2, C4, and C5. Thus, the input device 100A can detect a location of the feeling generating member 40 pressed by a user in the second prescribed direction of the feeling generating member 40.

Moreover, whether or not the clicking part 41 elastically is deformed (whether or not a clicking feeling is generated) may be determined based on a change in the electrostatic capacitance of the clicking detector C3. Moreover, the change in the electrostatic capacitances caused due to the elastic deformation of the feeling generating member 40 is observed also in the first to fourth pressure detectors C1, C2, C4, and C5. Thus, the generation of the clicking feeling may be detected by the first to fourth pressure detectors C1, C2, C4, and C5. In this case, the input device 100A does not have to include the clicking detector C3.

2. Variations

The above-described embodiment is a mere example of various embodiments of the present disclosure. Various modifications may be made to the above-described embodiment depending on design and the like as long as the object of the present disclosure can be achieved. Variations of the above-described embodiment will be described below.

Figure 10:
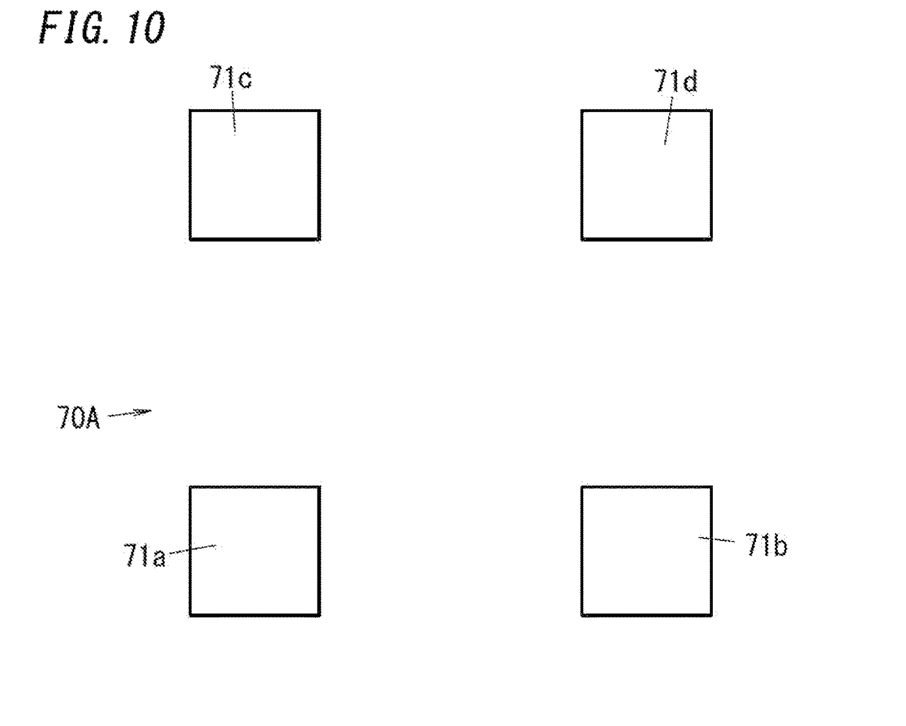
FIG. 10 is a plan view illustrating a protector of a variation.

FIG. 10 shows a protector 70A of a variation. In a similar manner to the protector 70, the protector 70A includes protection members (first to fourth protection members) 71a to 71d. However, unlike the protector 70, the protector 70A does not include the connection members (the first to fourth connection members) 72a to 72d. That is, the protector 70A includes individually separated protection members 71a to 71d. The protector 70A has an opening at a location facing a clicking part 41. Moreover, in a similar manner to the protector 70, the protector 70A has higher strength than the elastic body, and therefore, pressing force from a pressing member can be dispersed rather than locally. In place of the protector 70, the protector 70A is applicable to the input devices 100 and 100A.

Figure 11:
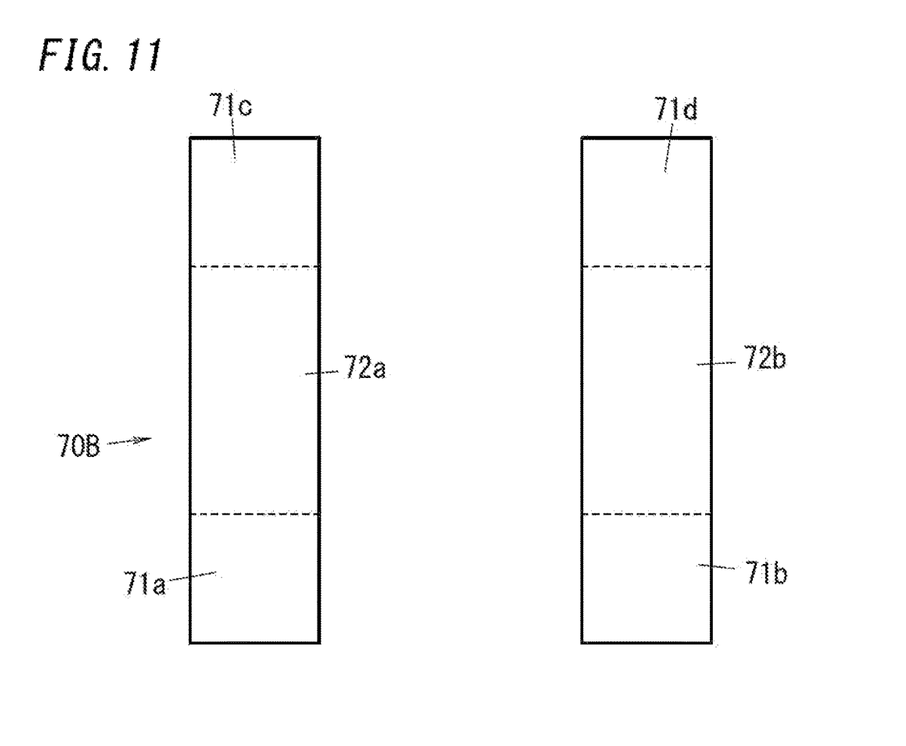
FIG. 11 is a plan view illustrating a protector of another variation.

FIG. 11 shows a protector 70B of another variation. In a similar manner to the protector 70, the protector 70B includes protection members (first to fourth protection members) 71a to 71d and first and second connection members 72a and 72b. Unlike the protector 70, the third and fourth connection members 72c and 72d are not provided. That is, in the protector 70B, the first and third protection members 71a and 71c are integral with each other, and the second and fourth protection members 71b and 71d are integral with each other. However, the first and third protection members 71a and 71c are members separated from the second and fourth protection members 71b and 71d. The protector 70B has an opening at a location facing a clicking part 41. Moreover, in a similar manner to the protector 70, the protector 70B has higher strength than the elastic body, and therefore, pressing force from a pressing member can be dispersed rather than locally. In place of the protector 70, the protector 70B may be applicable to the input devices 100 and 100A. Note that in still another variation, a protector includes, in a similar manner to the protector 70, protection members (first to fourth protection members) 71a to 71d and third and fourth connection members 72c and 72d, but the protector does not have to include the first and second connection members 72a and 72b unlike the protector 70. This variation also enables pressing force from a pressing member to be dispersed rather than locally. When at least two of the protection members of the plurality of pressure detectors are electrically connected to each other, it is easy to configure such that a conductive part facing the electrodes 11a to 11h is increased, and with this configuration, securing an electrostatic capacitance and improving the sensitivity of the pressure detectors are expected.

As can be seen from the first and second embodiments and the variations of FIGS. 10 and 11, the shape of the protector (70; 70A; 70B) is not particularly limited. However, at least one of the one or more pressure detectors, the protection member is preferably larger than the pressing member in plan view. In this case, the pressing force from the pressing member can be further distributed. Moreover, the number of protection members of the protector can be accordingly changed in accordance with the number of pressure detectors (the number of pressing members).

In the input device 100A, the protection members 71a to 71d are electrically conductive in the first to fourth pressure detectors C1, C2, C4, and C5. However, not all of the protection members 71a to 71d have to be electrically conductive. That is, in at least one of the one or more pressure detectors, the protection member may be electrically conductive or does not have to be electrically conductive. In sum, the protection member does not necessarily have to be electrically conductive. For example, the protection member may have an electrical insulation property. For example, the protection member may be made of the same material as the insulating sheet 30. In this case, the protection member may be formed integrally with the insulating sheet 30 (insulator 30a, 30b; 30d, 30e, 30g, 30h).

Moreover, in the input device (100; 100A), the number of pressure detectors is not particularly limited. For example, the input device includes at least one or more pressure detectors. For example, in the input device (100; 100A), the two pressure detectors C1 and C2 (or C4 and C5) are aligned in the first prescribed direction, but three or more pressure detectors (pressure sensors) may be aligned. In the input device 100A, the two pressure detectors C1 and C4 (or C2 and C5) are aligned in the second prescribed direction, but three or more pressure detectors (pressure sensors) may be aligned. In the input device (100; 100A), a plurality of pressure detectors (pressure sensors) may be arranged in a matrix (e.g., 2×2, 2×3, or 3×3).

Further, in the input device 100, the first to third elastic bodies 20*a* to 20*c* do not have to be electrically conductive. Both surfaces in the thickness direction of each of the first to third elastic bodies 20*a* to 20*c* may be rough surfaces or flat surfaces. Such variations are also applicable to the input device 100A. In sum, in at least one of the one or more pressure detectors, the surface of the elastic body facing the pressing member may be a rough surface or does not have to be a rough surface.

Furthermore, the shape of each components in the input device (100; 100A) is not limited to that described in the embodiments above. For example, the feeling generating member 40 is not limited to the above-described outer shape, and the shape of the clicking part 41 is not limited. The feeling generating member 40 does not have to include the clicking part 41. The shape of the pushing element 50 may be a shape (e.g., a rectangular plate shape) other than the disk shape. The shape of the housing 60 may be a shape (e.g., a cylindrical shape) other than the flat quadrangle box shape.

Moreover, in the input device (100; 100A), the shape of the electrodes (11*a* to 11*c*; 11*d* to 11*h*) is not limited to the shape in the above-described embodiments but may accordingly be changed in accordance with, for example, the shape of the feeling generating member (40) and/or the application of the pressure sensor.

Further, in the input device 100, the pair of terminals 12*a*, the pair of terminals 12*b*, and the pair of terminals 12*c* may protrude from a side surface, but not the second surface, in the thickness direction ff the body 61 of the housing 60. In this way, the influence caused by flux at the time of mounting the input device 100 is easily suppressed. This also applies to the input device 100A, and the terminals 12*d*, 12*e*, 12*f*, 12*g*, and 12*h* may protrude from the side surface, but not the second surface, in the thickness direction of the body 61 ff the housing 60.

Furthermore, in the input device 100, the insulating sheet 30 does not necessarily have to have a size that collectively covers the first to third elastic bodies 20*a*, 20*b*, and 20*c*. The insulating sheet 30 is required at least to prevent direct contact between the feeling generating member 40 and the first to third conductive members 10*a* to 10*c*. Thus, in the input device 100, the insulating sheet 30 at least includes the first to third insulators 30*a* to 30*c*. This also applies to the input device 100A, and the insulating sheet 30 at least includes the first to fifth insulators 30*d* to 30*h*. Here, in the feeling generating member 40, a surface corresponding to the first to third elastic bodies 20*a*, 20*b*, and 20*c* may be provided with an insulating layer or may be subjected to an insulation process, and in this case, the insulating sheet 30 may be omitted. This is also applicable to the input device 100A. In sum, not all of the one or more pressure detectors have to further include an insulator between the elastic body and the protection member. That is, at least one of the one or more pressure detectors may further include an insulator between the elastic body and the protection member or does not have to include the insulator.

Moreover, in the input device 100, each of the first and second pressure detectors C1 and C2 includes a single pressure sensor. However, each of the first and second pressure detectors C1 and C2 may include a combination of two or more pressure sensors. That is, two or more pressure sensors may be used as one pressure sensor. Such variations are also applicable to the input device 100A.

3. Aspects

As can be seen from the above-described embodiments and variations, the present disclosure includes below-described aspects. In the following description, only to clearly show the correspondence relationship to the embodiment, signs in parentheses are provided.

An input device (100; 100A) of a first aspect includes one or more pressure detectors (C1, C2, C4, C5). Each of the one or more pressure detectors (C1, C2, C4, C5) includes an electrode (11*a*, 11*b*; 11*d*, 11*e*, 11*g*, 11*h*), an elastic body (20*a*, 20*b*; 20*d*, 20*e*, 20*g*, 20*h*), a pressing member (42*a* to 42*d*), and a protection member (71*a* to 71*d*). The elastic body (20*a*, 20*b*; 20*d*, 20*e*, 20*g*, 20*h*) is on the electrode (11*a*, 11*b*; 11*d*, 11*e*, 11*g*, 11*h*). The pressing member (42*a* to 42*d*) is on an opposite side of the elastic body (20*a*, 20*b*; 20*d*, 20*e*, 20*g*, 20*h*) from the electrode (11*a*, 11*b*; 11*d*, 11*e*, 11*g*, 11*h*). The protection member (71*a* to 71*d*) is between the elastic body (20*a*, 20*b*; 20*d*, 20*e*, 20*g*, 20*h*) and the pressing member (42*a* to 42*d*). The protection member (71*a* to 71*d*) has higher strength than the elastic body (20*a*, 20*b*; 20*d*, 20*e*, 20*g*, 20*h*). According to the first aspect, the deterioration in performance is reduced.

An input device (100; 100A) of a second aspect would be realized in combination with the first aspect. In the second aspect, in at least one of the one or more pressure detectors (C1, C2, C4, C5), the protection member (71*a* to 71*d*) is electrically conductive. According to the second aspect, the sensitivity of the pressure detector is improved.

An input device (100; 100A) of a third aspect would be realized in combination with the first or second aspect. In the third aspect, in at least one of the one or more pressure detectors (C1, C2, C4, C5), the protection member (71*a* to 71*d*) is larger than the pressing member (42*a* to 42*d*) in plan view. According to the third aspect, pressing force from the pressing member is further distributed.

An input device (100; 100A) of a fourth aspect would be realized in combination with the second or third aspect. In the fourth aspect, the one or more pressure detectors (C1, C2, C4, C5) include a plurality of pressure detectors (C1, C2, C4, C5), and at least two of the protection members (71*a* to 71*d*) of the plurality of pressure detectors (C1, C2, C4, C5) are electrically connected to each other. According to the fourth aspect, securing electrostatic capacitances and improving the sensitivity of the plurality of pressure detectors are expected.

An input device (100; 100A) of a fifth aspect would be realized in combination with any one of the first to fourth aspects. In the fifth aspect, the input device (100; 100A) further includes a clicking part (41) having a plate-like shape and having a press surface (41*b*). Each of the one or more pressure detectors (C1, C2, C4, C5) is configured to detect pressing force that acts on the press surface (41*b*). According to the fifth aspect, a clicking feeling is generated.

An input device (100; 100A) of a sixth aspect would be realized in combination with the fifth aspect. In the sixth aspect, the input device (100; 100A) further includes a feeling generating member (40) including the clicking part (41) and a plurality of legs (42*a* to 42*d*). The plurality of legs (42*a* to 42*d*) are disposed to surround the clicking part (41) and supports the clicking part (41). The plurality of legs (42*a* to 42*d*) are the pressing members (42*a* to 42*d*) of the plurality of pressure detectors (C1, C2, C4, C5). According to the sixth aspect, the structure of the input device (100; 100A) is simplified.

An input device (100; 100A) of a seventh aspect would be realized in combination with the sixth aspect. In the seventh aspect, the input device (100; 100A) further includes a protector (70; 70A; 70B) between the feeling generating member (40) and the elastic bodies (20*a*, 20*b*; 20*d*, 20*e*, 20*g*, 20*h*) of the plurality of pressure detectors (C1, C2, C4, C5).

The protector (70; 70A; 70B) has an opening at a location facing the clicking part (41). The protection members (71a to 71d) of the plurality of pressure detectors (C1, C2, C4, C5) are portions of the protector (70; 70A; 70B) and support the plurality of legs (42a to 42d). According to the seventh aspect, the protection members (71a to 71d) are stably disposed.

An input device (100; 100A) of an eighth aspect would be realized in combination with any one of the first to seventh aspects. In the eighth aspect, each of the one or more pressure detectors (C1, C2, C4, C5) further includes an insulator (30a, 30b; 30d, 30e, 30g, 30h) between the protection member (71a to 71d) and the elastic body (20a, 20b; 20d, 20e, 20g, 20h). According to the eighth aspect, an improvement in the sensitivity of the pressure detector is expected.

An input device (100; 100A) of a ninth aspect would be realized in combination with any one of the first to eighth aspects. In the ninth aspect, in at least one of the one or more pressure detectors (C1, C2, C4, C5), the elastic body (20a, 20b; 20d, 20e, 20g, 20h) has a rough surface facing the pressing member (42a to 42d). With the ninth aspect, the linearity of a change in the electrostatic capacitance is improved.

REFERENCE SIGNS LIST 100, 100A INPUT DEVICE
C1, C2, C4, C5 PRESSURE DETECTOR
11a, 11b, 11d, 11e, 11g, 11h ELECTRODE
20a, 20b, 20d, 20e, 20g, 20h ELASTIC BODY
30a, 30b, 30d, 30e, 30g, 30h INSULATOR
40 FEELING GENERATING MEMBER
41 CLICKING PART
41b PRESS SURFACE
42a to 42d PRESSING MEMBERS (LEGS)
70, 70A, 70B PROTECTOR
71a to 71d PROTECTION MEMBERS
73 OPENING

The invention claimed is:

1. An input device, comprising one or more pressure detectors, each of the one or more pressure detectors including
an electrode,
an elastic body on the electrode,
a pressing member on an opposite side of the elastic body from the electrode, and
a protection member between the elastic body and the pressing member, the protection member having higher strength than the elastic body,
wherein in at least one of the one or more pressure detectors, the protection member being conductive,
the one or more pressure detectors including a plurality of pressure detectors, and at least two of the protection members of the plurality of pressure detectors being electrically connected to each other.

2. The input device of claim 1, wherein in at least one of the one or more pressure detectors, the protection member is larger than the pressing member in plan view.

3. The input device of claim 1, further comprising a plate-like clicking part having a press surface, wherein each of the one or more pressure detectors is configured to detect pressing force that acts on the press surface.

4. The input device of claim 3, further comprising a feeling generating member including the clicking part and a plurality of legs, wherein
the plurality of legs are disposed to surround the clicking part and support the clicking part, and
the plurality of legs are the pressing members of the plurality of pressure detectors.

5. The input device of claim 4, further comprising a protector between the feeling generating member and the elastic bodies of the plurality of pressure detectors, wherein
the protector has an opening at a location facing the clicking part, and
the protection members of the plurality of pressure detectors are portions of the protector and support the plurality of legs.

6. The input device of claim 1, wherein at least one of the one or more pressure detectors further includes an insulator between the protection member and the elastic body.

7. The input device of claim 1, wherein in at least one of the one or more pressure detectors, the elastic body has a rough surface facing the pressing member.

8. An input device, comprising:
one or more pressure detectors;
a plate-like clicking part having a press surface; and
a feeling generating member including the clicking part and a plurality of legs, each of the one or more pressure detectors including:
an electrode,
an elastic body on the electrode,
a pressing member on an opposite side of the elastic body from the electrode, and
a protection member between the elastic body and the pressing member, the protection member having higher strength than the elastic body,
each of the one or more pressure detectors being configured to detect pressing force that acts on the press surface,
the plurality of legs being disposed to surround the clicking part and support the clicking part, and
the plurality of legs being the pressing members of the plurality of pressure detectors.

9. The input device of claim 8, wherein in at least one of the one or more pressure detectors, the protection member is conductive.

10. The input device of claim 8, wherein in at least one of the one or more pressure detectors, the protection member is larger than the pressing member in plan view.

11. The input device of claim 8, further comprising a protector between the feeling generating member and the elastic bodies of the plurality of pressure detectors, wherein
the protector has an opening at a location facing the clicking part, and
the protection members of the plurality of pressure detectors are portions of the protector and support the plurality of legs.

12. The input device of claim 8, wherein at least one of the one or more pressure detectors further includes an insulator between the protection member and the elastic body.

13. The input device of claim 8, wherein in at least one of the one or more pressure detectors, the elastic body has a rough surface facing the pressing member.

* * * * *